(No Model.)
W. H. DILLON.
VELOCIPEDE.
No. 432,381. Patented July 15, 1890.
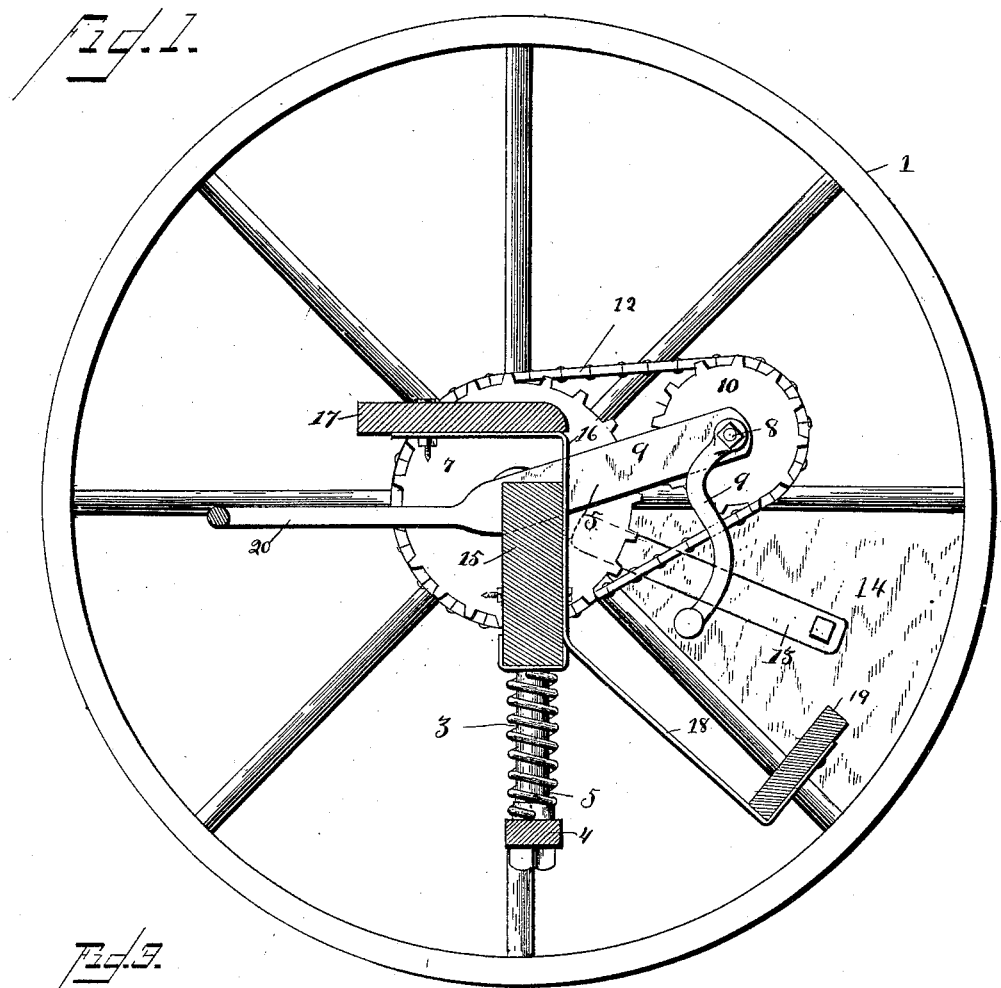
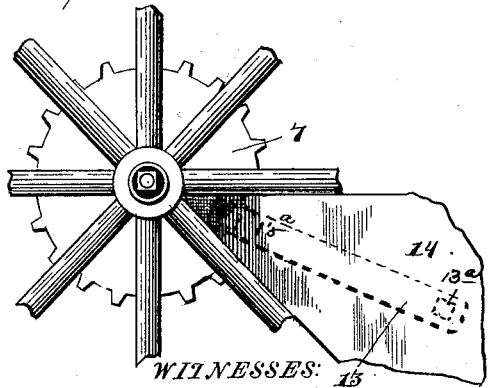
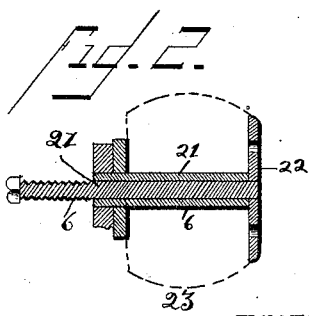
WITNESSES:
F. L. Ourand
W. L. Coombs
INVENTOR:
William H. Dillon,
by James Sagger & Co.
Attorneys

UNITED STATES PATENT OFFICE.

WILLIAM H. DILLON, OF ELKTON, KENTUCKY.

VELOCIPEDE.

SPECIFICATION forming part of Letters Patent No. 432,381, dated July 15, 1890.

Application filed March 8, 1890. Serial No. 343,151. (No model.)

*To all whom it may concern:*

Be it known that I, WILLIAM H. DILLON, a citizen of the United States, and a resident of Elkton, in the county of Todd and State of Kentucky, have invented certain new and useful Improvements in Velocipedes; and I do hereby declare that the following is a full, clear, and exact description of the invention, which will enable others skilled in the art to which it appertains to make and use the same.

My invention relates to improvements in velocipedes, or that class of vehicles which are propelled by the power of the rider.

The object of the invention is to provide such a vehicle which shall be simple and economical in construction, easy to operate, and capable of traveling at great speed with the expenditure of but little power. The construction is also such as to be very comfortable to the rider, and the devices and connections by which the power is transmitted to the wheels are located and arranged in such manner as to be within easy and convenient reach of the operator, thus enabling him to apply the power in the most effective manner.

The invention consists, essentially, in a pair of driving-wheels turning upon axles or spindles secured to a swinging frame composed of two vertical bars connected by a transverse rail, the said bars passing through the ends of the seat-rail, so that the latter is movable thereupon, and two forwardly-projecting bars which carry the driving-cranks, the latter bars and the vertical bars being made integral or connected with each other. In the forward ends of these projecting bars are journaled the shafts which carry at one end the driving-cranks and at the other ends the sprocket driving-pinions, connected by a sprocket-chain to a sprocket-wheel on the wheel-spindle, said sprocket-wheels being connected by means of pitmen to the driving-wheels, as will hereinafter appear. The lower ends of the vertical bars are connected together by means of a transverse rail. The seat is mounted centrally on a transverse rail. This rail is perforated near its ends, through which perforations the vertical bars pass, so that said rail and seat are movable vertically. Between the seat-rail and connecting-rail and embracing the vertical bars are coiled springs, for the purpose of giving ease and comfort to the rider, all as will be hereinafter more fully described.

The invention thus briefly outlined in the above description will now be described with reference to the accompanying drawings, in which—

Figure 1 is a central longitudinal sectional view of a velocipede constructed in accordance with my invention. Fig. 2 is a detail sectional view of a modification thereof. Fig. 3 is a detail side view showing the pitman connecting the sprocket-wheels and main wheels.

In the said drawings, the reference numeral 1 designates the driving-wheels, and 2 the swinging frame. This frame consists of the vertical bars 3, connected together by the transverse rail 4, and the forwardly-projecting arms 5.

6 designates the axle-spindles forming the journals for the driving-wheels, and upon these spindles are also journaled the sprocket-wheels 7. In the forward ends of the arms 5 are journaled shafts 8, the inner ends of which carry cranks 9, rigidly secured thereto. These shafts revolve freely in the arms 5, and are provided at their outer ends with sprocket-pinions 10, fast thereon and which rotate with said shafts. These pinions are connected with the sprocket-wheels 7 by sprocket-chains 12, so that motion imparted to the pinions 10 will be transmitted thereby to the sprocket-wheels. The sprocket-wheels 7 are connected with the driving-wheels 1 by means of connecting-bars 13 and pins or bolts 13$^a$. At the points where the pitmen are connected with the driving-wheels the latter are loaded by the interposition of a counterbalancing filling or plate 14. As the sprockets 7 revolve, the wheels will be rotated in unison therewith by means of the connecting-bars 13.

15 designates the seat-rail, which extends transversely across the swinging frame, being provided with perforations at the ends, within which fit the vertical bars 3, and centrally mounted on said rail, by means of the bars 16, is the seat 17. The bars 16 are secured to the seat-rail and extend downwardly and forwardly, as shown, their lower ends being bent to form arms 18, which receive and support the foot-rest 19. 20 designates a brace-bar secured to the swinging frame and serving to brace the same.

The operation is as follows: The operator mounts the seat 17, his feet resting upon the foot-rest 19 and his weight causing the swinging frame to assume the position shown in Fig. 1. He grasps the cranks with his hands and turns the same, causing the sprocket-pinion to be rotated, which in turn rotates the sprocket-wheels by means of the sprocket-chains. The rotation of the sprocket-wheels causes the driving-wheels to be rotated by means of the connecting-bars 13, the sprockets, connecting-bars, and wheels all moving together in unison. To turn the vehicle, it is simply necessary to hold the crank stationary on the side of the vehicle to which it is desired to go and to keep turning the other crank.

In the modification shown in Fig. 2 the axle-spindle is made tubular and provided with a shaft 21, extending therethrough. The driving-wheels are mounted on these spindles, while the sprocket-wheels are mounted on the inner ends of the shafts, which revolve freely within the spindles. The outer ends of the shafts are provided with cross-plates 22, which are secured to the wheel-hubs 23, and by which motion from the sprocket-wheels is transmitted to the driving-wheels, the connecting-bars 13 in this case being dispensed with.

The driving-wheels should be of large diameter, and they are preferably constructed of metal for strength and lightness, like the ordinary bicycle and tricycle wheels.

Instead of the sprocket wheels, pinions, and chains, I may employ ordinary cog-wheels gearing together, by which the motion from the crank-shafts is transmitted to the driving-wheels, although the first-named devices are preferable.

Having thus described my invention, what I claim is—

The combination, with the driving-wheels, of the swinging frame consisting of the vertical bars and forwardly-projecting bars or arms, connected together by a transverse rail, and the axle-spindles forming the journals for the driving-wheels, the shafts journaled in the arms, the cranks and sprocket-pinions secured to the shafts, the sprocket-chain, the connecting-bar connecting the sprocket-wheels and driving-wheels, the counterbalancing-plate secured to the driving-wheels, the seat-rail secured in the swinging frame, the seat and foot-rest connected therewith, and the coiled springs interposed between the seat-rail and transverse rail and embracing the vertical bars, substantially as described.

In testimony that I claim the foregoing as my own I have hereunto affixed my signature in presence of two witnesses.

WILLIAM H. DILLON.

Witnesses:
WILLIAM W. WEATHERS,
JOHN O. STREET.